3,642,806
5-PROPARGYLOXYMETHYL-2-SUBSTITUTED OXAZOLIDINONES
Claude P. Fauran and Guy M. Raynaud, Paris, Claude J. Gouret, Meudon, and Colette A. Douzon, Paris, France, assignors to Delalande S.A., Courbevoie, Hauts-de-Seine, France
No Drawing. Filed Sept. 10, 1969, Ser. No. 856,826
Int. Cl. C07d 31/44
U.S. Cl. 260—295 CA  3 Claims

ABSTRACT OF THE DISCLOSURE 5-propargyloxymethyl-2-substituted oxazolidinones of the formula:

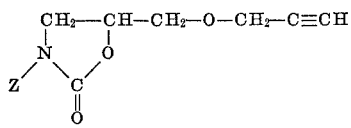

wherein Z represents a heterocyclic radical, are prepared by cyclising, in an alkaline medium, the corresponding 2-N-substituted carbamoyloxy-1-propargyloxy-3-chloro propanes. The compounds have sedative, myorelaxant, analgesic, antiinflammatory and hypotensive properties.

---

The present invention concerns new 5-proparaglyoxymethyl-2-substituted ozazolidinones, their process of preparation and their therapeutic application.

The compounds according to the present invention correspond to the general Formula I:

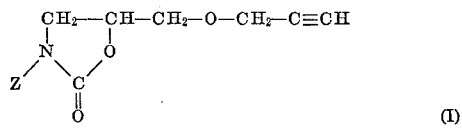

in which Z represents a heterocyclic radical.

The process for the preparation of the compounds of the present invention comprises cyclising, in an alkaline medium, a. 2-N-substituted carbamoyloxy-1-propargyloxy-3-chloro propane of the Formula II

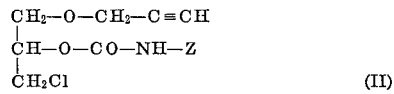

in which Z has the same significance as in Formula I.

The general method of preparation is as follows:

The 2-N-substituted carbamoyloxy - 1 - propargyloxy-3-chloro propane is dissolved in ethanol and there is then added slowly thereto a solution of an alkaline agent, for example potash or sodium ethylate, capable of combining with the starting material. Whilst cyclising the material liberates the corresponding halogenide, and forms a precipitate. On evaporating the solvent, the residue is taken up in water and extracted with chloroform. After removal of the solvent, a crystallised product is obtained which is purified by recrystallisation in an appropriate solvent.

The following preparations are given as non-limitative examples to illustrate the present invention.

EXAMPLE 1

5-propargyloxymethyl-3-(2'-thiazolyl)-2-oxazolidinone

In 500 cc. of absolute alcohol there is dissolved 51 g. of 1-propargyloxy - 2 - N-(2'-thiazolyl) carbamoyloxy-3-chloro propane and the temperature of the solution is increased to 65° C. with agitation. 100 ml. of an ethanol solution of sodium ethylate (0.19 mol) is then added slowly thereto. The mixture is then maintained under reflux for 10 minutes. After cooling, 100 cc. of water is added thereto and the alcohol is removed by distillation. The residue is extracted several times with chloroform. On concentration of the chloroform extract, a solid product is obtained which is recrystallised in absolute alcohol.

Yield=61%
Melting point =125–127° C.

*Elementary analysis.*—Calculated (percent): C, 50.41; H, 4.23; N, 11.76. Found (percent): C, 50.47; H, 4.49; N, 11.94.

EXAMPLE 2

5-propargyloxymethyl-3-(2'-pyridyl)-2-oxazolidinone

A solution of 134 g. of 1-propargyloxy-2-N-(2'-pyridyl) carbamoyloxy-3-chloro propane is heated to 60° and treated, under agitation, with a ethanolic solution of 0.5 mol of sodium ethylate. After termination of the addition, the mixture is heated under reflux for 15 minutes. After removal of the solvent, the residue is taken up in 200 cc. of water and extracted with ethyl acetate. Concentration of this organic solution yields a solid product is recrystallised in 96° alcohol.

Yield=40%
Melting point=92° C.

*Elementary analysis.*—Calculated (percent): C, 62.06; H, 5.21; N, 12.06. Found (percent): C, 61.87; H, 5.42; N, 12.01.

EXAMPLE 3

5-propargyloxymethyl-3-(1'-piperidino)-2-oxazolidinone 30 g. 1-propargyloxy-2-N-(1'-piperidino) carbamoyloxy-3-chloro propane are dissolved in 250 ml. of absolute alcohol; the solution is heated to 40° C. with agitation and one hour an ethanol solution of 0.14 mol of potash is added thereto. The mixture is left in contact for one hour and then the solvent is removed by distillation and the residue is taken up in water and extracted with ethyl acetate. After concentration of the organic phase, a solid product is obtained which is crystallised in isopropyl ether.

Yield=77%
Melting point=56° C.

*Elementary analysis.*—Calculated (percent): C, 60.48; H, 7.61; N, 11.76. Found (percent): C, 60.53; H, 7.75; N, 11.79.

EXAMPLE 4

5-propargyloxymethyl-3-(2'-pyrimidino)-2-oxazolidinone

A solution of 17 g. of 1-propargyloxy-2-N-(2'-pyrimidino)-carbamoyloxy-3-chloro propane in 350 cc. of absolute alcohol is prepared and the solution is heated to 70° C. There is then slowly added thereto 0.07 mol of potash dissolved in 100 ml. of alcohol. After completion of the addition, the mixture is heated under reflux for one hour. The solution obtained is concentrated, taken up in 200 ml. of water and extracted with ethyl acetate. Removal of the solvent yields a solid product which is crystallised in 96° alcohol.

Yield=61%
Melting point=106° C.

*Elementary analysis.*—Calculated (percent): C, 56.65; H, 4.75; N, 18.02. Found (percent): C, 56.87; H, 5.00; N, 17.92.

The compounds according to the present invention have been tested on animals in the laboratory and have been shown to possess, in particular, sedative, myorelaxant, analgesic, anti-inflammatory and hypotensive properties.

(1) Sedative properties.—Administration of the compounds of the present invention in mice provoke a diminution of the motility measured either in an actimetre having a luminous beam and photo-electric cells or by the evasion test on an inclined plane, a diminution in the corporeal temperature and a potentialisation of the narcosis obtained by injection of an infrahypnotic dose of penthiobarbital.

The results obtained with the compounds of general Formula I show that all these compounds cause effects characteristic of sedatives.

The results obtained with two of these compounds are given in Table I below:

TABLE I

| Z | Tests— | |
|---|---|---|
| | Evasion | Potentialisation of penthiobarbital |
| (pyrimidinyl) | Hypomobilising DE 50=140 mg./kg. | DE 50=150 mg./kg./P.O. |
| (pyridyl) | | DE 50=175 mg./kg./P.O. |

(2) Myorelaxant properties.—The compounds of the present invention exert on mice an opposite antagonism of the mortal convulsions provoked by strychnine and provoke in the same animal a loss in the reflex posture. They equally inhibit the traction reflex on a taut horizontal metallic thread and the maintainance of a rotary rod turning slowly.

The results obtained with three of the compounds of general Formula I are given below in Table II.

TABLE II

| Z | Tests, DE 50 | | |
|---|---|---|---|
| | Antagonism against strychnine | Rotating rod | Traction |
| (thiazolyl) | 125 mg./kg./P.O. | 250 mg./kg./P.O. | |
| (pyridyl) | 38 mg./kg./P.O. | 200 mg./kg./P.O. | 205 mg./kg./P.O. |
| (pyrimidinyl) | 50 mg./kg./P.O. | | |

(3) Analgesic properties.—The compounds according to the present invention inhibit the painful stretchings provoked by an intraperitoneal injection of phenylbenzoquinone.

The results obtained with two of the compounds of general Formula I are given below in Table III:

TABLE III

| Z | Protection against phenylbenzoquinone |
|---|---|
| (N-piperidinyl) | DE 50=150 mg./kg./P.O. |
| (pyrimidinyl) | DE 50=110 mg./kg./P.O. |

Anti-inflammatory properties.—The compounds according to the present invention reduce the phlogogenic effects produced by an under-planar injection of carragenine in the rat.

For example, the DE 50 of 5-propargyloxymethyl 3-(2'-pyridyl)-2-oxazolidinone is 200 mg./kg./P.O.

As is shown by the results given above and in Table IV below, the difference between the pharmacologically active doses and the lethal doses is sufficiently great to enable the compounds of general Formula I to be used therapeutically.

TABLE IV

| Z | DL 50 (mice), mg./kg. |
|---|---|
| (thiazolyl) | 950 |
| (pyridyl) | 510 |
| (N-piperidinyl) | 750 |
| (pyrimidinyl) | 550 |

Hypotensive properties.—A progressive and prolonged lowering of the blood-pressure in the rat is observed following intraveinous injection of the compounds according to the present invention.

The compounds of general Formula I are utilised for the treatment of irritability, emotivity, motive and psychoneurotic instability, and insomnia as well as pains and traumatic, inflammatory and other muscular tenseness and contractions.

They are administered in the form of tablets and suppositories containing from 10 to 400 mg. of active ingredient, as well as ointments containing 0.5 to 5% of active ingredient.

The process for obtaining a 2-N-substituted carbamoyloxy-1-propargyloxy-3-chloro propane comprises reacting 2-chloroformyloxy-3-chloro-1-propargyloxy propane of the Formula III

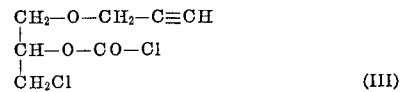

with an amine of the Formula IV

in which Z has the same significance as in Formula I.

The compound of Formula III is itself prepared by reacting phosgene with 1-propargyloxy-3-chloro-2-propanol in solution in toluene, and in the presence of a tertiary amine intended to fix the hydrochloric acid arising during the course of the reaction.

The general method of preparation is as follows:

To a solution in toluene of 2-chloroformyloxy-3-chloro-1-propargyloxy propane (1 mol per litre) heated to 100°

C., there is slowly added the amine (Z—NH$_2$) in solution in its volume of toluene. The formation of a hydrochloride precipitate is observed. Heating is maintained for one hour under reflux, the mixture is then treated with water and the organic phase is separated. After removal of the solvent a crude product is obtained which, according to its form, is purified either by distillation under reduced pressure or by crystallization in an appropriate solvent.

The following preparation is given as a nonlimitative example to illustrate the preparation of a 2-N-substituted carbamoyloxy-1-propargyloxy-3-chloro propane.

2-N-(2'-thiazolyl) carbamoyloxy-3-chloro-1-propargyloxy propane.—A toluene solution (500 cc.) of 0.5 mol of 2 - chloroformyloxy - 3-chloro-1-propargyloxy propane is heated to 60° C. There is then added thereto slowly, with agitation, 99 g. of 2-amino thiazole in solution of 500 cc. of anhydrous toluene. Contact is maintained at 70° C. for one hour, and, after cooling, the organic solution is washed successively with 10% hydrochloric acid, a bicarbonate solution and finally with water. Concentration of the toluene solution yields a crude product which is crystallized in 96° alcohol.

Yield=55%
Melting point=108° C.

*Elementary analysis.*—Calculated (percent): C, 43.72; H, 4.04; N, 10.10. Found (percent): C, 43.81; H, 3.86; N, 10.02.

What is claimed is:
1. 5-propargyloxymethyl-2-substituted oxazolidinones of the Formula:

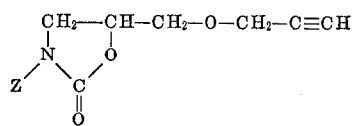

in which Z is selected from the group consisting of thiazolyl and pyridyl.

2. A compound according to claim 1, in which Z is 2'-pyridyl.

3. A compound according to claim 1, in which Z is 2'-thiazolyl.

References Cited
UNITED STATES PATENTS
3,558,662  1/1971  Bruderer et al. ____ 260—306.8

ALAN L. ROTMAN, Primary Examiner

U.S. Cl. X.R.

260—256.4 N, 294.3 B, 295.5 C, 306.8 R; 424—250, 251, 266, 267

UNITED STATES PATENT OFFICE
CERTIFICATE OF CORRECTION

Patent No. 3,642,806  Dated February 15, 1972

Inventor(s) Claude P. Fauran, Guy M. Raynaud, Colette A. Douzon and Claude J. Gouret It is certified that error appears in the above-identified patent and that said Letters Patent are hereby corrected as shown below:

Column 1, between lines 8 and 9; please insert ---Claims Priority, Application Great Britain, September 20, 1968, 44 933/68---.

Signed and sealed this 22nd day of May 1973.

(SEAL)
Attest:

EDWARD M. FLETCHER, JR.
Attesting Officer

ROBERT GOTTSCHALK
Commissioner of Patents